United States Patent [19]

Seats et al.

[11] 4,240,073
[45] Dec. 16, 1980

[54] CATHODE RAY TUBE DISPLAY SYSTEM WITH DISPLAY LOCATION MEMORY

[75] Inventors: Peter Seats, Boonton, N.J.; Henry O. Marcy, Oak Brook, Ill.

[73] Assignee: Thomas Electronics, Inc., Wayne, N.J.

[21] Appl. No.: 906,051

[22] Filed: May 15, 1978

[51] Int. Cl.³ .............................................. G06F 3/14
[52] U.S. Cl. .................... 340/703; 340/736; 340/720; 340/739; 340/799; 358/60; 178/15
[58] Field of Search .............. 340/701, 703, 705, 732, 340/736, 739, 798, 799, 814, 720; 358/60; 315/367, 368; 178/15

[56] References Cited

U.S. PATENT DOCUMENTS

| 3,524,022 | 8/1970 | Schoenthal | 178/15 |
| 3,798,363 | 3/1974 | Melchior | 340/707 |
| 3,811,113 | 5/1974 | Saito et al. | 340/701 |
| 3,948,279 | 3/1976 | Austefjord | 315/368 |
| 4,031,542 | 6/1977 | Anderson | 358/60 |
| 4,032,968 | 6/1977 | Miyoshi et al. | 358/60 |
| 4,054,907 | 10/1977 | Itoh | 358/60 |
| 4,087,835 | 5/1978 | Mishimura et al. | 358/60 |
| 4,095,137 | 6/1978 | Oswald | 315/367 |

*Primary Examiner*—Marshall M. Curtis
*Attorney, Agent, or Firm*—Davis, Hoxie, Faithfull & Hapgood

[57] ABSTRACT

A cathode ray tube display system apparatus and method in which a memory stores the addresses necessary to cause the electron beam of a cathode ray tube to impinge upon predetermined locations on the cathode ray tube screen. A single beam electron gun can thus selectively activate different types of phosphors in an array of phosphor locations to produce, for example, a multicolor display. An apparatus and method in which a memory stores addresses necessary to cause images to be projected at predetermined locations in a cathode ray tube projection display system.

25 Claims, 7 Drawing Figures

CATHODE RAY TUBE DISPLAY SYSTEM WITH DISPLAY LOCATION MEMORY

There are two principal categories of multicolor cathode ray tube (CRT) displays: (1) those in which the display screen is made up of phosphors of different light emitting types which are arranged to be activated by electrons of differing energies and (2) those in which the display screen is made up of interspersed arrays of phosphor elements (such as dots) of different light-emitting types. The latter category of display screens are employed with means for directing the electron beam to the phosphor elements of the desired light-emitting type.

Cathode ray tubes of the first category most commonly have the phosphors arranged in layers, so that the degree of penetration of the electrons into the screen determines which phosphor types are activated. This kind of cathode ray tube is limited by the low light output of at least one of the phosphor types as the result of the low energy of the electrons which excite one of the layers, the need for light from at least one type of phosphor to pass through other phosphors to the viewer, and the loss of electron energy occurring as they penetrate through the phosphor layers to the layer closest to the viewer. In the latter case, the accompanying activation of intervening layers also reduces the range of available colors. Such cathode ray tubes also impose difficult circuit problems including the rapid switching of large electron accelerating voltages in order to change colors and the adjustment of electron beam deflection circuitry in an effort to compensate for the resulting differences in electron beam energy, and thereby obtain the same electron deflection characteristics for each color.

Cathode ray tubes of the second category, in which the display screen is in the form of an array of interspersed phosphor dots or lines, require the precision placement of an electron beam onto selected phosphor screen elements in response to a commanded two-axis control input to deflection means. The deflection means may be either magnetic deflection coils, electrostatic deflection plates or some combination thereof.

In prior cathode ray tube display systems employing the array type screen, it has been difficult to accurately direct the electron beam or electron beams to phosphor elements of the desired color emitting types. In particular, this is due to electron geometry errors and environmental deflection field disturbances.

Examples of geometry errors include lack of precision of axial gun alignment with respect to the display screen and non-linear deflection response within the deflection means due to errors in the mechanical structure of the deflection system. Examples of environmental deflection field disturbances include a DC or AC magnetic field from external circuit components or the earth's magnetic field, any of which can cause deflection of the beam independently of the primary deflection system.

Attempts to solve these problems associated with precision beam placement have generally followed the course of compensating deflection signals and fields, shielding against external fields, and tolerance control with respect to the mechanical design of the CRT envelope, the electron gun phosphor array, alignment, and the tolerances associated with the deflection means.

The most common of the second category of color cathode ray tubes having array screens is the shadow mask tube employed in conventional color television sets. A foraminous shadow mask, which is placed a fraction of an inch behind an array of tricolor-emitting phosphor elements (dots or lines), permits electrons from each of three electron guns to strike only phosphor elements of one color-emitting type. Sets of a phosphor screen and a shadow mask are individually made for each tube by a photographic process. The mask only passes a fraction of the electrons to the phosphor screen.

Other types of color cathode ray tubes of the array screen type have been disclosed in the literature, but have not had any significant success. One is the switching grid type, which employs a form of mask a short distance from the screen to deflect an electron beam to the desired color-emitting phosphors. Another which has received a great deal of attention is the indexing tube, in which emissions from an array of energy-emitting indexing elements interspersed with the phosphor arrays is collected and the signal produced thereby is employed with appropriate circuits in an effort to supply the correct color information in the electron beam when it impinges on the corresponding color-emitting elements.

A new approach to the solution of the precise placement problem is hereby disclosed in this invention. The novel technique of this invention employs an electronic memory which stores information regarding the location of the interspersed elements of the phosphor screen of the particular color cathode ray tube in its environment. As a result, the color display system can cause the electron beam of the color cathode ray tube to be directed to activate a particular color light-emitting phosphor at a particular location on the display screen without the need for a shadow mask, switching grid or interspersed indexing elements.

IN THE DRAWINGS

Figure 1:
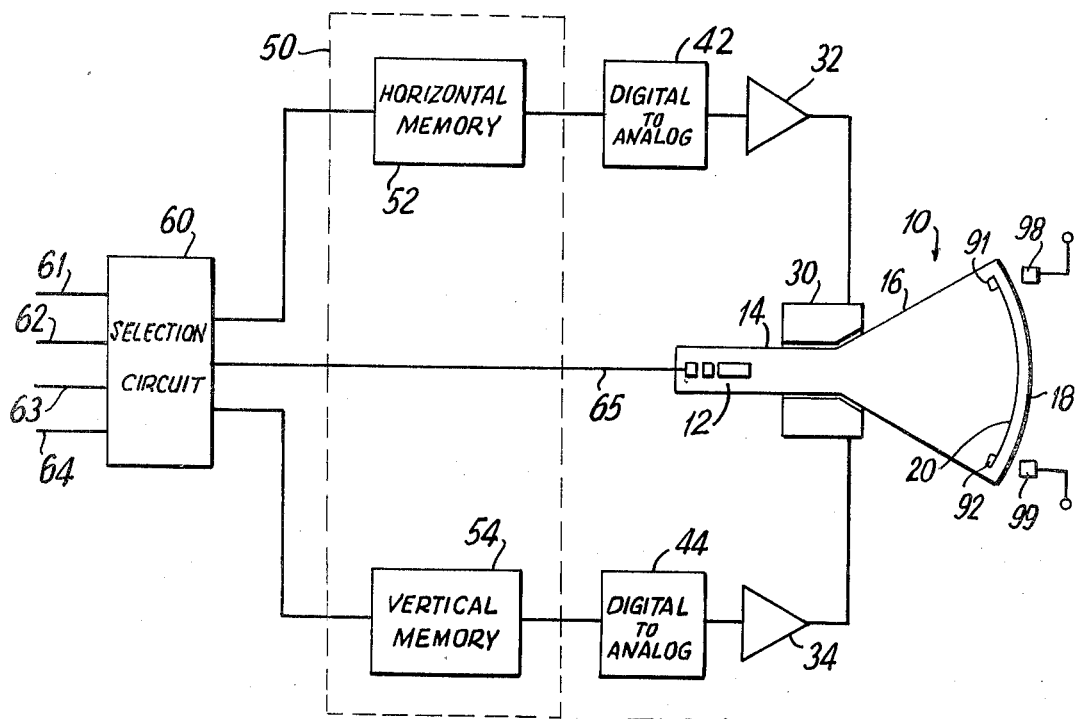
FIG. 1 is a schematic diagram of the invention with a cathode ray tube and address memories.

In the embodiment of our display system, shown in FIG. 1, a cathode ray tube 10 has an electron gun 12 located in conventional fashion in the neck region 14 of the vacuum envelope 16. The phosphor screen 20, comprising the display screen, is located on the inner surface of the faceplate 18. A yoke 30, comprising a pair of magnetic coils, surrounds the neck 14 at its transition to the funnel portion of the vacuum envelope 16.

Figure 2:
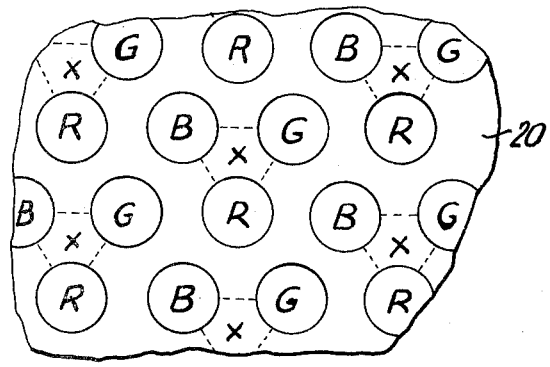
FIG. 2 illustrates an array of interspersed phosphor elements on the face of a cathode ray tube.

As shown in part in FIG. 2, the phosphor screen 20 comprises a plurality of interspersed phosphor elements. In this embodiment, there are three different interspersed arrays of light emitting types of phosphors in the form of dots R, G and B, which emit red, green and blue light respectively.

The deflection coils of the yoke 30 are driven by the horizontal and vertical deflection amplifiers 32 and 34. Alternately, other coordinate systems—such as a polar coordinate system—may be employed. The yoke 30 and the deflection amplifiers 32 and 34 comprise conventional deflection means.

The deflection amplifiers are controlled by the address from the output of the memory 50, which for convenience may be assumed to include a horizontal memory 52 and a vertical memory 54. This address is not the actual coordinates of the location of element of the phosphor screen 20 which is to be activated, but rather is the information necessary to deflect the electron beam to that location. Since conventional deflection amplifiers are usually analog devices and the most common memory devices are of the binary digital type, digital to analog converters 42 and 44 are provided to couple the memories 52 and 54 to their corresponding amplifiers 32 and 34.

A selection circuit 60 is employed to cause the memories 52 and 54 to produce the address of the desired phosphor element. The inputs to the selection circuit 60 include the coordinates of the location of the element of the phosphor screen 20 (inputs 61 and 62), the color of the element (input 63) and the desired intensity (input 64). The selection circuit 60 applies the location and color information to the inputs of the memory 50 to cause it to produce the address of the selected element. After a sufficient period of time for the deflection amplifiers 32 and 34, and the yoke 30 to stabilize, the selection circuit 60 produces a signal from its output 65 which causes the electron gun to emit sufficient electrons to produce the desired intensity.

The cathode ray tube 10 can be manufactured and assembled with the rest of the display system of FIG. 1 and the location of the phosphor elements of the particular cathode ray tube 10 can be recorded in the memory 50 by connecting a master scanning generator directly to the inputs of the deflection amplifiers 32 and 34. By scanning all of the phosphor screen 20 with a closely spaced raster, all of the phosphor elements will be activated in a time dependent fashion. The output of the phosphor screen 20 is then collected by a photo-detector, such as a photomultiplier tube, through a color selective filter—for example—a red filter. The output of the photo-detector is a series of pulses which can be interpreted to locate the positions of the phosphor elements.

Figure 4:
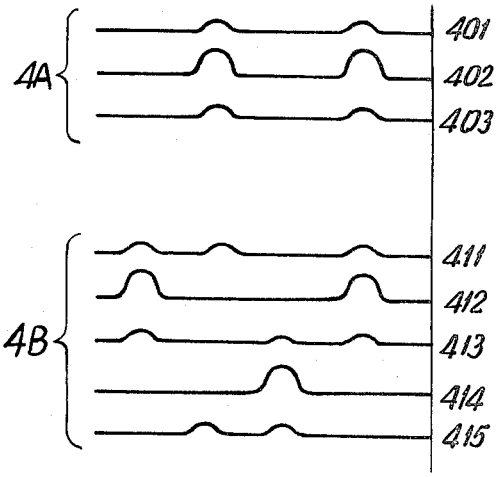
FIG. 4 illustrates the pulse outputs from one phosphor color resulting from the scans illustrated in FIG. 3.
Figure 3:
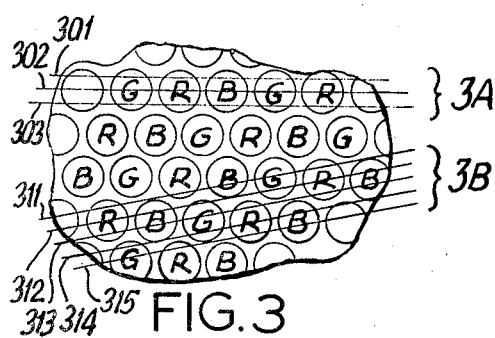
FIG. 3 illustrates two sets of scanning paths across the face of a cathode ray tube.

FIG. 3 shows a small portion of a tri-color phosphor screen, in which the phosphor elements of one light-emitting type have been indicated. Lines 301, 302 and 303 in FIG. 3A represent the center of the scanning paths impinged by the electron beam on successive master scans. FIG. 4A represents the pulse output from a photo-detector as a result of sequentially scanning on these paths, where a filter selective to the red color-emitting type phosphor, in this example, is placed between the photo-detector and the phosphor screen. In particular, pulse trains 401, 402 and 403 represent the photo-detector outputs from the red phosphor dots for scanning lines 301, 302 and 303, respectively.

The example of FIG. 3A shows electron beam scanning in substantially the same direction as the phosphor dots are aligned. This technique for identifying the location of phosphor dots also will work when scanning is not aligned with the rows of phosphor dots, as shown, for example by FIGS. 3 and 4B, in which pulse trains 411–415 represent the photo-detector output from the red phosphor dots as a result of scanning on paths 311–315. The time at which the pulses of greatest width and amplitude occur indicates that the electron beam has traversed nearest the center of a phosphor dot. The location of the center of the phosphor dot can be determined from the successive scan information by use of known pattern recognition data processing techniques, even if the size of the area impinged by the electron beam approaches the size of the phosphor element. Once the location of the phosphor element is determined in terms of the time at which it was impinged at the center by the electron beam, the address of that phosphor element is stored in the memory 50 in terms of the information necessary to cause the deflection amplifiers 32 and 34 of the particular display system of FIG. 1 to cause the electron beam to impinge that location.

The apparatus for this process of locating the phosphor elements and causing their addresses to be stored can be a part of the display system proper or an attachable subsystem which can be used to set up a number of display systems of this type.

Another technique for locating a position on a phosphor screen in terms of the signal required to deflect the electron beam to the position is disclosed in U.K. Patent Specification No. 1,495,161.

In accordance with our invention, the address of each phosphor element can be stored or, alternatively, the address of a limited number of points (such as one element of each cluster of phosphor dots or the locations indicated by X in FIG. 2) can be stored together with the interpolation function necessary to provide to the deflection system with the addresses for adjoining phosphor elements.

As a further refinement in accordance with our invention, the cathode ray tube 10 is provided with indexing reference regions that result in an electrical signal being generated whenever the electron beam is incident upon a reference region. This may be accomplished in a number of ways; for example, the reference regions can be electrodes placed within the tube structure along the periphery of the phosphor screen 20. Or, as shown in FIG. 1, the reference regions can be phosphor elements in predetermined locations such as reference regions 91 and 92 which emit light of a different wavelength from that of the rest of the screen 20, together with associated light detectors 98 and 99 to determine when the beam is incident on a particular reference region 91 and 92. The result is the presence of an electrical signal at the output of a detector 98 and 99 when the beam impinges on the associated reference region 91 and 92.

Figure 5:
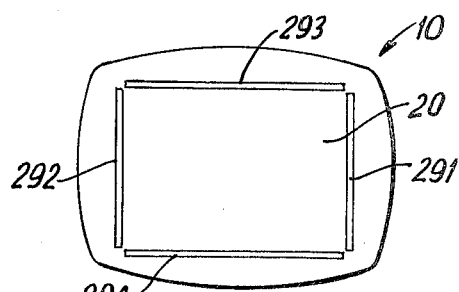
FIG. 5 illustrates the face of a cathode ray tube with indexing reference regions.
Figure 6:
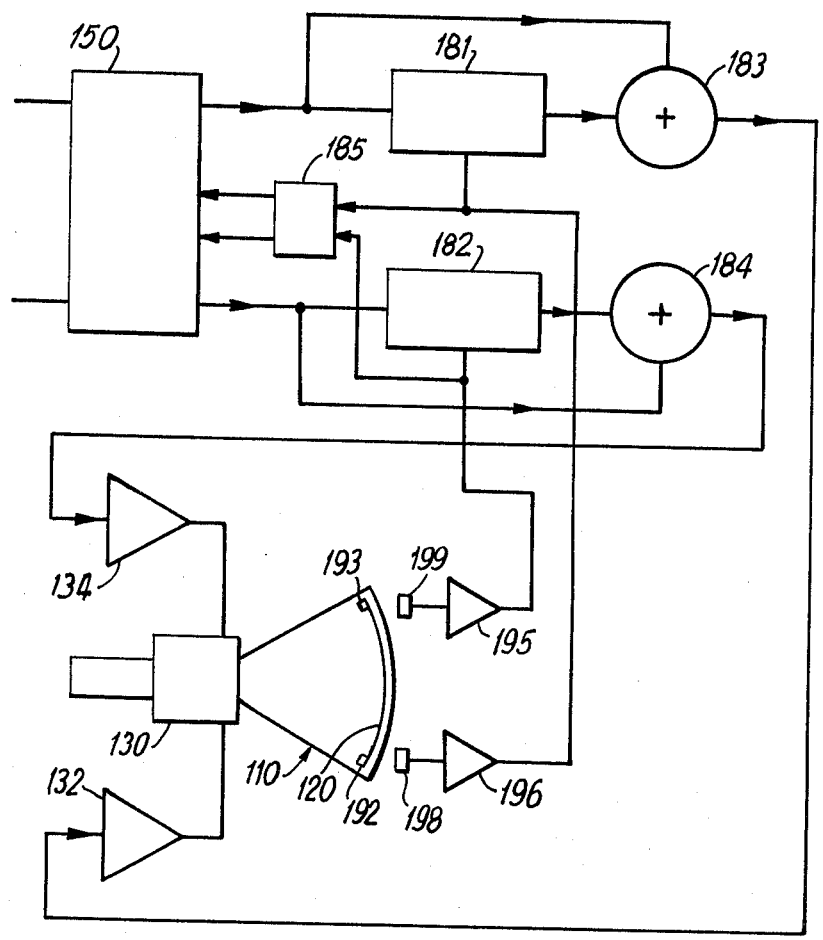
FIG. 6 is a schematic diagram of the invention of FIG. 1 having indexing reference regions with correction circuitry.

The information provided by the signals produced when the beam is incident on the reference regions 91 and 92, and any other reference regions provided within the tube, is employed to reduce the effect of general electrostatic or magnetic field changes and circuit related drift upon the scanning pattern of the electron beam. In FIG. 5, typical indexing reference regions 291, 292, 293 and 294 are arranged as stripes of ultraviolet emitting phosphors. Regions 291 and 292 are arranged vertically along the edges of the useful area of the phosphor screen 20 and regions 293 and 294 are similarly arranged horizontally along the upper and lower edges. FIG. 6 shows the use of two of these regions 192 and 193 in connection with detectors 198 and 199 to provide signals indicative of when the beam has impinged upon the reference regions. As a result, a signal from detector 198 is indicative of the beam's position in the horizontal direction and a signal from detector 199 is indicative of the beam's position in the vertical direction.

FIG. 6 also shows a block diagram illustrating a method and apparatus for utilizing indexing reference regions 192 and 193 in the cathode ray tube 110 to regulate the deflection characteristics of a cathode ray tube display system. For the illustrative purpose of this example, we assume the reference regions 192 and 193 provide information regarding the location of the electron beam in the horizontal and vertical directions respectively. Detectors 198 and 199 each produce an electrical signal when their corresponding reference region 192 or 193 is activated by the electron beam.

The memory 150 stores the address information necessary to produce deflection to the desired location on the phosphor screen 120 of the cathode ray tube 110. The difference detector 181 produces a digital difference signal which is a function of the difference in time between when the memory 150 produces the address of a reference region, such as 192, and the time when the detector 198 and the beam position amplifier 192 produce a signal indicating that the beam is impinging on the reference region 192. This difference signal, which represents correctable error, is added by conventional techniques represented by AND-circuit 183 to the address from the memory 150 and replaces the address stored in the memory 150 for the reference region 192. Reference point 193, detector 199, beam positions amplifier 195, difference detector 182 and the adder circuit represented by AND-circuit 184 function in the same fashion to correct the address stored in the memory for reference region 193. The signals from the difference detectors 181 and 182 can also be fed to logic circuits 185 respectively to provide error corrective information for the other addresses of locations on the phosphor screen 120 in accordance with predetermined mathematical functions.

Figure 7:
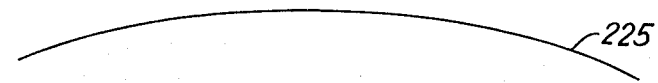
FIG. 7 illustrates the invention in the form of three projection cathode ray tubes projecting only a display screen.
Figure 7:
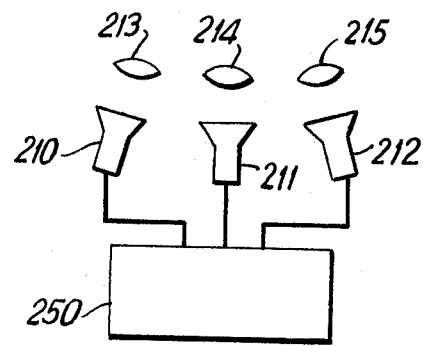

Our invention also has particular utility in connection with projection of images from plural cathode ray tube screens, as in the case of projection television. As shown in FIG. 7, three projection cathode ray tubes 210, 211 and 212 are employed with their associated lenses systems 213, 214 and 215 to project a single display on a display screen 225. For example, cathode ray tubes 210, 211 and 212 can each have a different light emitting type phosphor image screen and their lenses systems are arranged to provide superimposed images. Memory 250 provides the required addresses for each of the cathode ray tubes 210, 211 and 212 to cause the same information to be displayed at the same location on the display screen 225. In another embodiment, cathode ray tubes 210, 211 and 212 are employed to project adjoining images on the display screen 225. Memory 250 coordinates these displays by providing the addresses necessary for the information to appear at the correct locations over the entire display screen 225 regardless of which cathode ray tube 210, 211 or 212 projects the information.

We claim:

1. A multicolor display apparatus comprising
   a cathode ray tube having an electron gun for emitting an electron beam and an electron beam activated display screen comprising a plurality of elements,
   a memory for recording the addresses of locations of such elements on the display screen,
   address selection circuit means connected to the memory to cause the memory to provide the address of a selected location, and
   electron beam deflection means responsive to the output of the memory for deflecting the electron beam to the location having the address specified by the memory output.

2. The display apparatus of claim 1 wherein the display screen comprises a plurality of interspersed elements of electron-activated phosphors of two or more different light-emitting types.

3. The display apparatus of claim 1 wherein the display screen comprises a plurality of clusters of at least three electron-activated phosphor dots each of a different light-emitting type.

4. The display apparatus of claim 1 wherein the display screen comprises a plurality of groups of at least three adjacent lines of electron-activated phosphors, each line in a group being different light-emitting type.

5. The display apparatus of claim 1, further comprising one or more indexing reference regions, means for scanning the electron beam across at least a portion of the display screen, means for detecting the time when an electron beam is incident upon an indexing region, a memory section for storing information concerning the time when the electron beam was expected to impinge upon the indexing reference region and means for determining the difference between these times.

6. The display apparatus of claim 5, further comprising summing means for adding a function of the difference in times to the information stored in the memory with respect to the indexing reference region and means for compensating for this difference in accordance with predetermined functions with respect to the addresses stored in the memory when the screen is later scanned.

7. A display system comprising at least two projection cathode ray tubes, each having an electron gun for emitting an electron beam and an electron beam activated image screen.
   a projection display screen,
   a lens system for projecting images produced by action of the electron beams on the image screens onto the display screen,
   a memory for recording the address of each of a plurality of locations on the display screen, each corresponding to a position on the image screens of a plurality of the cathode ray tubes,
   address selection means connected to the memory to provide the address of a selected location, and
   electron beam deflection means responsive to the output of the memory for deflecting one of the electron beams to the position on an image screen corresponding to the display screen location specified by the memory output.

8. The system of claim 7 wherein each of a plurality of positions on the image screens of each of two or more cathode ray tubes corresponds to the same location on the display screen.

9. The display system of claim 8 wherein each of the image screens is of a different light-emitting phosphor and the system is arranged to present multi-color displays.

10. The system of claim 7 wherein the positions on a first image screen correspond to locations in one area of the display screen and the positions on a second image screen correspond to locations on an adjacent area of the display screen.

11. The display apparatus of claim 1 wherein the plurality of locations are spaced apart on the display screen and a plurality of sub-locations for which no address is stored are located in the vicinity of each of the locations, further comprising means for storing in association with the address of each location a formula for deflecting the electron beam to any desired sub-location.

12. A method for displaying information on a cathode ray tube having an electron gun for emitting an electron beam and an electron beam activated display screen comprising a plurality of elements, comprising:
   activating a memory into which has been recorded the adresses of locations of such elements on the display screen, the activated memory in response providing the address of a selected location,
   emitting the electron beam from the electron gun within the cathode ray tube toward the display screen, and
   deflecting the electron beam to the selected location having the address specified by the memory output, in response to the output of the memory.

13. The method of claim 12 wherein deflecting the electron beam includes deflecting the beam to activate an element of electron-activated phosphor which is interspersed on the display screen with elements of one or more different light emitting types of phosphors.

14. The method of claim 12 further comprising
   scanning the electron beam across at least a portion of the display screen,
   indexing the electron beam by detecting the time when the beam is incident upon an indexing region of the display screen and determining the difference between that incident time and the time when the electron beam was expected to impinge upon the indexing region.

15. The method of claim 14 further comprising
   adding a function of the difference in times to the information stored in the memory with respect to the indexing reference region, and
   adjusting the addresses stored in the memory in accordance with predetermined functions of the difference in time.

16. A method for displaying information on a projection display screen with at least two projection cathode ray tubes, each tube having an electron gun for emitting an electron beam and an electron beam activated image screen comprising: focusing the image on the image screen of each of the cathode ray tubes onto at least a portion of the display screen;
   activating a memory into which has been recorded the address of a plurality of locations on the display screen, the activated memory in response providing the address of a selected location;
   emitting the electron beam from an electron gun within cathode ray tube toward its image screen, and
   deflecting the electron beam to impinge upon the image screen of its cathode ray tube thereby producing light at a location on the display screen having the address specified by the memory output wherein light is focused on at least some of the locations on the display screen by the image screens of two or more cathode ray tubes.

17. The display apparatus of any of claims 1 through 6 and 11 wherein a single electron gun producing a single electron beam is employed.

18. The display method of any of claims 12 through 16 wherein a single electron gun producing a single electron beam is employed.

19. A display apparatus comprising
   a cathode ray tube having an electron gun for emitting an electron beam, and a display screen comprising a plurality of interspersed elements of electron-activated phosphors of two or more different light-emitting types,
   a memory for recording the addresses of locations of such elements on the display screen,
   address selection circuit means connected to the memory to cause the memory to provide the address of a selected location, and
   electron beam deflection means responsive to the output of the memory for deflecting the electron beam to the location having the address specified by the memory output.

20. The display apparatus of claim 19, further comprising one or more indexing reference regions, means for scanning the electron beam across at least a portion of the display screen, means for detecting the time when an electron beam is incident upon an indexing region, a memory section for storing information concerning the time when the electron beam was expected to impinge upon the indexing reference region and means for determining the difference between these times.

21. The display apparatus of claim 20, further comprising summing means for adding a function of the difference in times to the information stored in the memory with respect to the indexing reference region and means for compensating for this difference in accordance with predetermined functions with respect to the addresses stored in the memory when the screen is later scanned.

22. The display apparatus of any of claims 19 through 21 wherein a single electron gun producing a single electron beam is employed.

23. A method for displaying information on a cathode ray tube having an electron gun for emitting an electron beam, and an electron beam activated display screen comprising a plurality of interspersed elements of electron-activated phosphors of two or more light-emitting types, comprising:
   activating a memory into which has been recorded the addresses of locations of such elements on the display screen, the activated memory in response providing the address of a selected location,
   emitting the electron beam from the electron gun within the cathode ray tube toward the display screen, and
   deflecting the electron beam to the selected location having the address specified by the memory output, in response to the output of the memory.

24. The method of claim 23 further comprising
   scanning the electron beam across at least a portion of the display screen,
   indexing the electron beam by detecting the time when the beam is incident upon an indexing region of the display screen and determining the difference between that incident time and the time when the electron beam was expected to impinge upon the indexing region,
   adding a function of the difference in times to the information stored in the memory with respect to the indexing reference region, and
   adjusting the addresses stored in the memory in accordance with predetermined functions of the difference in time.

25. The display method of claims 23 or 24 wherein a single electron gun producing a single electron beam is employed.

* * * * *